United States Patent
Fischer et al.

(10) Patent No.: US 8,493,590 B2
(45) Date of Patent: Jul. 23, 2013

(54) SYSTEM AND METHOD FOR TRANSMITTING HIGH THROUGHPUT DATA BETWEEN MULTIPLE DEVICES

(75) Inventors: Matthew Fischer, Mountain View, CA (US); Stephen Ray Palm, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1388 days.

(21) Appl. No.: 11/528,844

(22) Filed: Sep. 27, 2006

(65) Prior Publication Data

US 2007/0226351 A1   Sep. 27, 2007

Related U.S. Application Data

(63) Continuation-in-part of application No. 11/397,660, filed on Apr. 3, 2006, now Pat. No. 8,009,642.

(60) Provisional application No. 60/785,869, filed on Mar. 24, 2006.

(51) Int. Cl.
*G06F 3/12* (2006.01)
*G06F 9/445* (2006.01)
*H04W 4/00* (2009.01)

(52) U.S. Cl.
USPC .......... 358/1.15; 370/328; 370/338; 370/254; 370/401; 370/449; 717/174; 717/176

(58) Field of Classification Search
USPC ....................................................... 358/1.15
See application file for complete search history.

(56) References Cited

U.S. PATENT DOCUMENTS

| | | | |
|---|---|---|---|
| 7,082,320 B2 * | 7/2006 | Kattukaran et al. | 455/562.1 |
| 7,706,338 B2 * | 4/2010 | Kondylis et al. | 370/338 |
| 8,145,732 B2 * | 3/2012 | Kumar et al. | 709/220 |
| 2006/0101456 A1 * | 5/2006 | Crosier et al. | 717/174 |
| 2006/0225089 A1 * | 10/2006 | Ikeda | 725/25 |
| 2006/0270415 A1 * | 11/2006 | Waxman | 455/452.2 |
| 2008/0317047 A1 * | 12/2008 | Zeng et al. | 370/401 |

* cited by examiner

*Primary Examiner* — Hilina S Kassa
(74) *Attorney, Agent, or Firm* — Garlick & Markison

(57) ABSTRACT

A system for transmitting data directly between a plurality of client network devices in a network is disclosed. The system may include a first client network device having a first client ("STA") module and a second client network device of the plurality of client network devices where the second client network device includes a Dual Access Point and Station enabled device ("DAS-enabled device").

20 Claims, 15 Drawing Sheets

DATA may be sent using ordinary STA-AP protocol.

SYSTEM AND METHOD FOR TRANSMITTING HIGH THROUGHPUT DATA BETWEEN MULTIPLE DEVICES

CROSS REFERENCE To RELATED APPLICATIONS

This application is a continuation-in-part of and claims priority to U.S. patent application Ser. No. 11/397,660, titled "System For Transmitting High Throughput Data Between Multiple Devices," by Stephen R. Palm, filed Apr. 3, 2006. This application also claims priority to U.S. Provision Patent Application 60/785,869, titled "System and Method for Connecting and Transmitting Data Between Multiple Devices," by Matthew Fischer and Stephen R. Palm, filed Mar. 24, 2006. Both of these applications are herein incorporated by reference in their entirety.

BACKGROUND OF THE INVENTION

1. Field of the Invention

The invention relates to management of communication networks, and in particular to a system for connecting multiple devices and transmitting high throughput data between the devices.

2. Related Art

Telecommunication systems continue to evolve and expand their presence in modern society. As an example, wireless networking has grown in popularity as a result of the improvements in portable computers (i.e., laptop computers), wireless technology, broadband access to the Internet, network gaming, and the growing popularity of networking computer systems together into local area networks ("LANs") for both business and consumer applications. The most popular types of wireless networks for connecting multiple computers are at present configured utilizing the Institute of Electrical and Electronics Engineers ("IEEE") 802.11 standard, which are generally known as a "802.11 networks," "Wireless Fidelity networks," "Wi-Fi networks," or "WiFi networks."

Generally, an 802.11 network includes at least two communication devices in signal communication with each other via a wireless signal path, where "in signal communication" generally means that the at least two communication devices may be electrically, optically, and/or magnetically connected, coupled, adjoined, affixed, attached, bonded, fastened, chained, harnessed, hooked, strapped, tied, clasped, mated, interfaced, fused, combined, or assembled in a way that allows either direct signals, information, data, or packets of data to pass from one communication device to another communication device via the signal path. An Access Point ("AP") acts as a communication hub for the plurality of wireless communication devices to connect into a wireless LAN ("WLAN") and/or into a wired LAN if the communication device is in signal communication with the wired LAN. The wireless communication devices are generally known as "802.11 clients," "clients," "client devices," "stations" ("STAs"), "802.11 stations," "nodes," and/or "802.11 STAs." Additionally, when STAs are in signal communication with an AP, it is referred to as infrastructure mode.

With the maturing of the different amendments of the baseline standard (such as, for example, IEEE 802.11a, 802.11b, and 802.11g) for 802.11 networks, there is an increasing interest in home networking to enable users to enjoy the ubiquitous availability of digital content that a home network provides. In these networks, many forms of data may be exchanged between the network devices including, for example, voice, financial and business information, digital content, audio and/or visual ("AV") material, and e-mail, to name a few. Much of this information, such as AV material, generally requires that large amounts of data be transmitted across the network.

Unfortunately, existing 802.11-based WLANs were primarily designed and deployed with the functionality and intention of supporting data-centric applications, as opposed to media applications, where the traffic generated by these data-centric applications is typically presented to the network in bursts of large amounts (e.g. e-mail data and/or file transfer data). Generally, this traffic is not required to meet any targets for latency of delivery, nor is this traffic required to have a specific lower limit of bandwidth so as to provide a satisfactory user experience. As such, traffic generated by these data-centric applications is commonly referred to as "best-effort" traffic.

However, the next generation of WLAN devices are expected to carry data (i.e, "streams of data") that originate from multimedia sources, and that have explicit and implicit requirements regarding both latency of delivery and minimum bandwidth. This new type of traffic is referred to as quality of service ("QOS") traffic.

As a result, if the WLAN network components (and the WLAN itself) are unable to provide sufficient bandwidth to meet the QOS-specific bandwidth requirements and/or are unable to deliver QOS traffic within the QOS-specific latency requirements, then the user experience for the applications that generated the QOS traffic will be compromised, and potentially, unsatisfactory.

The next generation of WLAN technology includes some new functionality that is intended to provide adequate bandwidth and latency for QOS applications through additional, higher speed physical layer data rates and enhanced medium access control ("MAC") features that allow differentiation of access to the network for packets from different classes of service, as well as providing efficiency enhancements. However, a difficulty in the deployment of new products that employ the next generation of WLAN technology for the delivery of multi-media streams is that the new products need to coexist with existing WLAN network technology.

As an example, a problem exists when a WLAN network is already installed in a home or office and a user wishes to add both a multi-media source and a multi-media sink to the WLAN network. Unfortunately, if two IEEE 802.11 clients attempt to exchange data between one another in infrastructure mode, data is exchanged through the AP where the data is first sent from the first client to the AP and then the AP retransmits the data to the second client because traditional WLAN networks rely on the AP as a layer-2 and sometimes layer-3, redirector of traffic. Traditionally, all traffic in the WLAN must pass through the AP, where the AP determines the next "hop" in the path to the destination and forwards the packet further along that path. For example, data that is sourced from one network STA and intended for delivery to another STA must pass through the AP, even though it may be physically possible for the two endpoints (i.e., the two STA) to communicate directly. This may cause data between clients to take approximately twice as long to be delivered or to utilize twice as much throughput.

As an example in FIG. 1, a block diagram of an example of an implementation of a known network architecture 100 for data transfer between client devices utilizing the 802.11 standard is shown. As mentioned above, in infrastructure networks, the 802.11 standard requires that data transfer occur between an AP and a client device. As an example, the known network architecture 100 may include Device A 102, Device B 104, and Device C 106. In this example, Device C 106 is in signal communication with both Device A 102 and Device B 104 via signal paths 108 and 110, respectively. Additionally, Device C 106 may function as an AP, and Device A 102 and Device B 104 may function as STAs where Device A 102 functions as a media server and Device B 104 functions as a media render. Generally, a media server is device, or software module, that processes multimedia applications such as, for example, AV streaming, still image storage, and music streaming programs. A media render is a device, or software module, that is capable of receiving and processing data from the media server and possibly also presenting that information to the end user.

In an example of operation, if Device A 102 is to transmit data to Device B 104, a data signal 112 is first transmitted from Device A 102 to Device C 106, via signal path 108, and then retransmitted from Device C 106 to Device B 104 via signal path 110. While this arrangement is functional, it is not efficient since it takes approximately twice as long to transmit data from Device A 102 to Device B 104 through Device C 106 than it would to directly transmit the data from Device A 102 to Device B 104. Unfortunately, this generally reduces the total throughput in a shared medium transmission system such as an 802.11 network by approximately one-half.

As an example, if a new multi-media source ("MMS") and multi-media sink ("MMK") are added to the known network architecture 100, they will communicate with the AP (such as, for example, Device C 106) as new clients. As a result, all traffic from the MMS (i.e., a new multi-media stream) must pass through the AP in order to eventually reach the MMK. In this example, it is appreciated that the path through the AP requires each packet of data for the multi-media stream to be transmitted twice—once by the MMS and once by the AP. Because the WLAN medium is shared among all transmitters of the WLAN, the total available network bandwidth is reduced by these second transmissions. For example, a stream of packets originating from a source that is connected non-wirelessly (such as on an Ethernet) to the AP will traverse the WLAN only once to reach a client STA of the AP. However, a stream of packets that is sourced by a STA of the AP must be sent twice on the WLAN in order to reach another STA of the AP. It is appreciated that if all transmissions in the network require a second wireless transmission by the AP, then the second transmission effectively reduces the total available bandwidth to one-half. Alternatively, any traffic which requires a second wireless transmission by the AP requires twice the bandwidth of a transmission which does not require a second wireless transmission by the AP.

Attempted solutions to this problem include an IEEE 802.11 e amendment to IEEE 802.11 that includes a Direct Link Setup ("DLS") functionality that allows data transfer to be setup directly between clients. In FIG. 2, a block diagram of an example of an implementation of the traditional network architecture 200 utilizing the proposed IEEE 802.11e DLS functionality for data transfer between clients is shown. As an example, the known network architecture 200 may include Device A 202, Device B 204, and Device C 206. In this example similar to the previous example shown in FIG. 1, Device C 206 is in signal communication with both Device A 202 and Device B 204 via signal paths 208 and 210, respectively. However, unlike the example in FIG. 1, in this example, Device A 202 and Device B 204 may be in signal communication via signal path 212. Similar to FIG. 1, in this example, Device C 206 may function as an AP, and Device A 202 and Device B 204 may function as STAs where Device A 202 functions as a media server and Device B 204 functions as a media render.

In an example of operation, if Device A 202 is to transmit to Device B 204 utilizing IEEE 802.11e DLS (or similar proposals), Device A 202 negotiates with Device C 206 in order to setup a connection with Device B 204. Device C 206 then negotiates a connection with Device B 204 and after negotiation Device A 202 transmits data directly to Device B 204 without passing through Device C 206. Therefore, in this example, Device C 206, acting as an AP, must be utilized by both Device A 202 and Device B 204 in order to enable Device A 202 and Device B 204 to communicate to each other even if the communication is going to be only between Device A 202 and Device B 204.

While under certain circumstances the process of data transmission as described in FIG. 2. may be more efficient than the process described in FIG. 1, the process described in FIG. 2. unfortunately requires that all three communicating devices on the network implement the new DLS functionality. Generally, the DLS functionality needs the participation of the AP during the exchange of DLS setup frames including a set of setup frames called Traffic Specifications (TSPECs). AP participation is unlikely in a typical scenario because there are approximately 100 million 802.11 devices that had already been deployed in the field before the creation of the IEEE 802.11e amendment that defined DLS functionality. Additionally, the next generation IEEE 802.11e WLAN mechanisms to support QOS streams are presently considered complex and costly to implement and, as a result, most vendors have chosen not to support DLS functionality or some other features of 802.11e that are necessary for DLS functionality. As such, APs that have been created, purchased and/or deployed following the release of the IEEE 802.11e amendment are still unlikely to support DLS functionality. Therefore, there is a need for a system and method to transmit data between client devices with high overall throughput and low latency that is backward compatible with existing network devices.

BRIEF SUMMARY OF THE INVENTION

A system and method for transmitting high throughput data between multiple devices, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
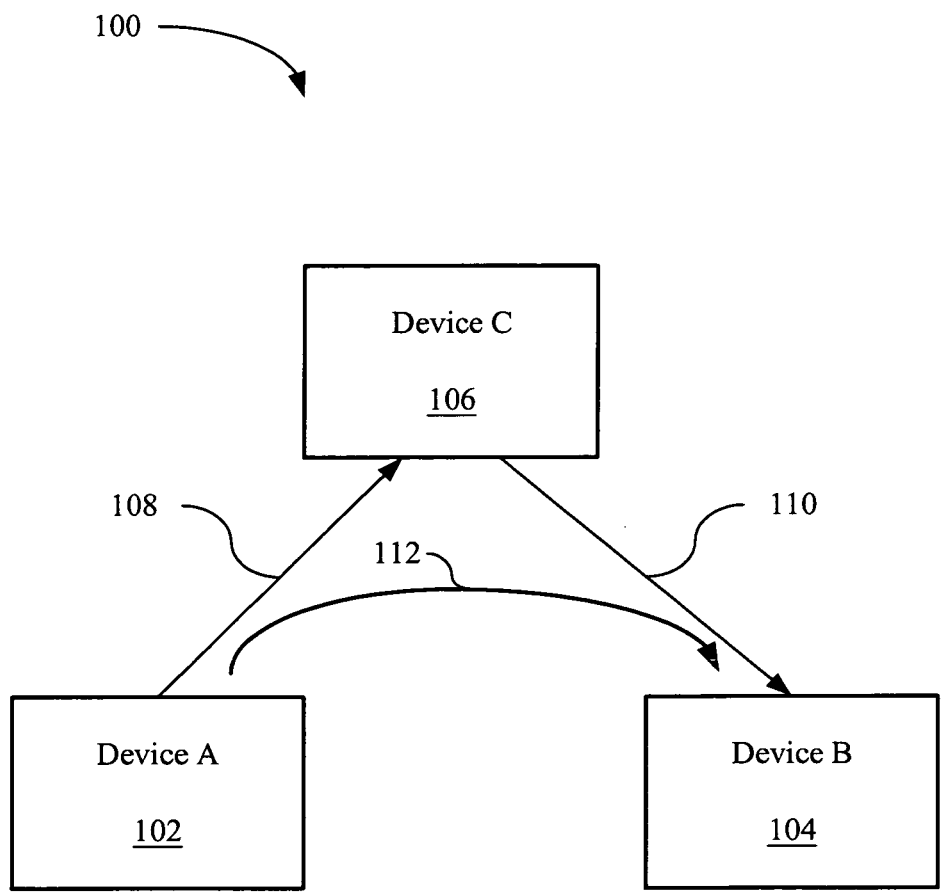
FIG. 1 shows a block diagram of an example of an implementation of a known network architecture for data transfer between IEEE 802.11 clients.
Figure 2:
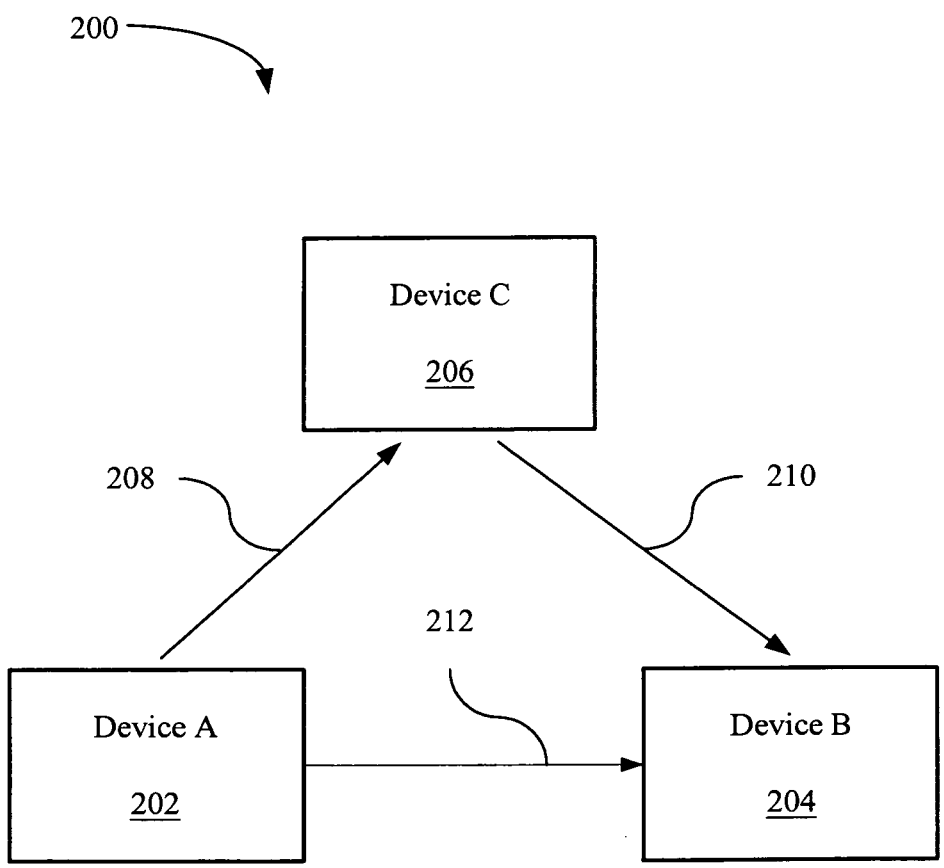
FIG. 2 shows a block diagram of an example of an implementation of a known network architecture utilizing an IEEE 802.11e Direct Link Setup ("DLS") functionality for data transfer between clients.

In the following description of the preferred and various alternative embodiments, reference is made to the accompanying drawings that form a part hereof, and in which is shown by way of illustration a specific embodiment in which the invention may be practiced. It is to be understood that other embodiments may be utilized and structural changes may be made without departing from the spirit and scope of this invention.

The invention is described with reference to various functional block diagrams, which illustrate possible applications and embodiments of the invention from a functional perspective. These functional block diagrams should not be interpreted to imply or otherwise require a particular physical architecture in accordance with the partitioning of the functionality depicted therein. Instead, it will be appreciated by one of ordinary skill in the art that various alternative physical architectures (whether hardware, software or a combination thereof) may be utilized to implement the described functionality. For example, the invention may be implemented utilizing various hardware and software components, including, for example, utilizing a semiconductor integrated circuit (e.g., a chip) or a combination of semiconductor integrated circuits (e.g., a chipset or multi-chip module), or in associated circuitry, or in the software, firmware, protocol stacks, libraries, algorithms or other processes operating thereon (or in any configuration of one or more of the foregoing). The chip or chipset implementation may include an integrated circuit, including, for example, any of the following alone or in combination: an application specific integrated circuit ("ASIC"), a digital signal processor ("DSP"), or another general-purpose or specific-purpose processor, and associated circuitry (e.g., memory, co-processors, busses, etc.).

Additionally, although the following description makes reference to particular communication network technologies and network entities as examples, it is appreciated by those skilled in the art that this description is not limited to these examples and other network technologies examples supporting a different arrangement of network entities also may be employed without departing from the spirit and scope of the invention. In addition, the description makes reference to terms such as "devices," "modules," and "functions". It is appreciated that a device and/or module performing a given function "x" as part of its operation also may be referred to as an "x" device, "x" module, or as an "x" function, interchangeably, without departing from the spirit or scope of the invention.

A system for transmitting data directly between a plurality of client network devices in a network having an Access Point ("AP") device separate from the plurality of client network devices is disclosed. The system may include a first client network device and a second client network device of the plurality of client network devices. The first client network device may include a first client ("STA") module and a second STA module. The first STA module may be configured to selectively communicate with the AP device. The second client network device may include a client AP module and a third STA module. The third STA module may be configured to selectively communicate with the AP device. The second STA module of the first client network device may be configured to selectively communicate with the client AP module of the second client network device.

Additionally within the system disclosed, a Dual Access Point and Station ("DAS")-enabled device for transmitting data directly between the DAS-enabled device and the plurality of client network devices is also disclosed. The DAS-enabled device may include a client ("STA") module and a client AP module. The STA module may be configured to selectively communicate with the AP device or communicate directly with a first client network device from the plurality of client network devices. The client AP module may be configured to selectively communicate directly with the first client network device or another client network device from the plurality of client network devices.

Figure 3:
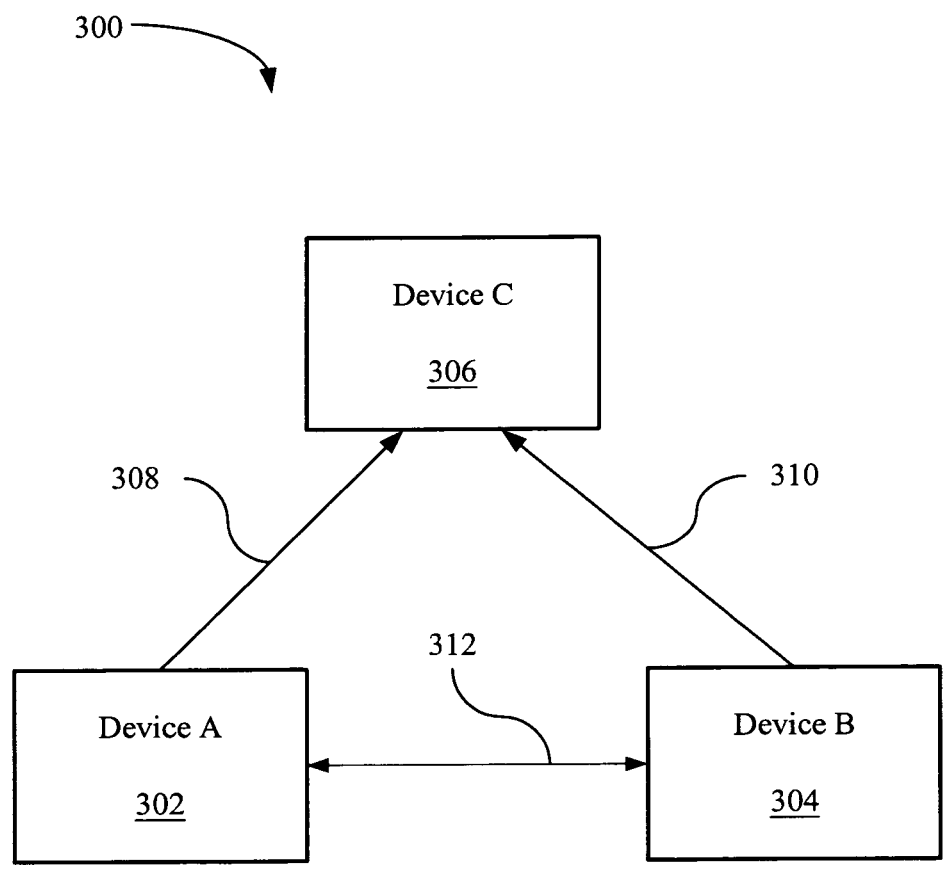
FIG. 3 shows a block diagram of an example of an implementation of a network architecture of a system for transmitting high throughput data between multiple devices ("STDMD") in accordance with the invention.

Turning to FIG. 3, a block diagram of an example of an implementation of a network architecture of a system for transmitting high throughput data between multiple devices ("STDMD") 300 in accordance with the invention is shown. The STDMD may include Device A 302, Device B 304, and Device C 306. In this example, Device C 306 is in signal communication with both Device A 302 and Device B 304 via signal paths 308 and 310, respectively. Additionally, Device A 302 and Device B 304 may be in signal communication via signal path 312.

In this example, one or more network devices (such as, for example, Device A 302, Device B 304, and Device C 306) within the network architecture of the STDMD 300 may be in signal communication with one or more other network devices. Moreover, one or more of these network devices may implement a Dual Access Point and Station ("DAS") functionality that allows signal communication to traditional Access Points ("APs"), traditional client devices (i.e., stations "STAs"), or other DAS devices. In general, a DAS-enabled device implements a new functionality, in addition to functionality traditionally associated with one or more APs and/or traditionally associated with one or more STAs. Generally, the DAS-enabled device's new functionality has both AP and STA functionality and a DAS-enabled device may be associated to multiple networks. Each packet of data to or from the DAS-enabled device is to be transmitted on at least one of the networks and selecting a network for transmission may be based on addresses such as, for example, media access control ("MAC") and/or Internet protocol ("IP") address. Additionally, a DAS-enabled device may receive any packet of data from any network of which it is a member. The DAS-enabled device may have DAS functionality as a result of having zero or more AP modules and one or more STA modules within the DAS device. Because the DAS-enabled device may have more than one STA module, the DAS-enabled device may also act as a STA in more than one network.

Therefore, in this example, Device C 306 may function as an AP, and Device A 302 and Device B 304 may function as STAs to Device C 306. However, if Device A 302 is a DAS-enabled device, then Device A 302 may function as a media server and an client AP to device B 304 and an STA to device C 306. Similarly, if Device B 304 is a DAS-enabled device, then Device B 304 that may function as a media render and an STA to Device A 302 and an STA to Device C 306. In this example, both Device A 302 and Device B 304 may utilize an association configuration protocol ("ACP") that allows devices to easily determine the AP, client AP, and STA functionality relationships to each other. As an example, Device A 302 and Device B 304 also may be client devices such as 802.11 client devices and Device C 306 also may be an 802.11 AP type device such as 802.11 AP device.

In an example of operation, Device A 302 is to transmit data directly to Device B 304 and still have the ability to transfer some data to and from Device C 306, Device B 304 is also to receive data directly from Device A 302 and still have the ability to transfer some data to and from Device C 306, and Device C 306 implements the functionality traditionally associated with an AP. However in this example, Device C 306 may be unaware of the request and protocol related with Device A 302 transmitting directly to Device B 304.

As mentioned above, a DAS-enabled device may implement one or more of the following functionalities, in addition to functionality traditionally associated with one or more APs, functionality traditionally associated with one or more STAs, and functionality associated with an ACP.

Association Control Protocol ("ACP")

A DAS-enabled device may implement an ACP Configurator functionality and/or ACP Client functionality. An ACP Configurator may be adapted to broadcast an ACP type-length-value ("TLV") indicating an open ACP Window. The ACP TLV may be broadcast utilizing layer-2 broadcast and/or layer-3 broadcast messaging.

Besides the exchange of information related to security, other types of information may also be exchanged within the network architecture of the STDMD 300 of FIG. 3. For example, client configuration information may be exchanged by the STDMD 300. Additionally, Quality of Service ("QoS") parameters, such as Network User Priorities, may be assigned by the ACP Configurator, based on traffic information provided by an ACP Client. Moreover, an ACP Configurator and ACP Client may exchange device and service capabilities information.

ACP-Configurator: Layer-2

If the ACP utilizes layer-2 broadcast messaging, when the ACP process is initiated on a DAS enabled device, the ACP-configurator may add an ACP TLV field (such as, for example, type, length, value) to an Information Element ("IE") in its beacons to the network. An example of an IE structure is shown below:

```
struct acp_ie {
    uchar id;
    uchar len;
    uchar oui[3];
    uchar ver;
    uchar assoc;
    uchar flags;
    uchar acp_tlv[0]; /* Optional TLVs */
} PACKED;
```

The ACP data field of the TLV may have the following format:

| Bit Position | Description | Value |
|---|---|---|
| 0-5 | ACP Version | 1 to 63 |
| 6 | ACP-window open | 1 if ACP window is currently open, 0 otherwise |
| 7 | AP Recently Configured | 1 if AP was configured during the current ACP session, 0 otherwise |
| 8-15 | Length | Length in bytes of the ACP TLV |
| 16 | STA capable | 1 if device may operate as a STA |
| 17 | Multi-STA capable | 1 if device may operate as a STA in multiple SSIDs |
| 18 | AP capable | 1 if device may operate as an AP |
| 19 | Multi-AP capable | 1 if device may operate as an AP in multiple SSIDs |
| 20 | UPnP AV Server capable | 1 if device may operate as an UPnP AV server |
| 21 | UPnP AV Client capable | 1 if device may operate as an UPnP AV client |
| 22 | DLNA Media Server capable | 1 if device may operate as a DLNA Media server |
| 23 | DLNA Media Client capable | 1 if device may operate as a DLNA Media client |
| ... | ... | ... |

ACP-Configurator: Layer-3

If the ACP utilizes layer-3 broadcast messaging, a layer-3 ACP broadcast may be performed using a General Event Notification Architecture ("GENA") NOTIFY method such as, for example, the GENA Notify method described in the document by J. Cohen, S. Aggarwal, Y. Y. Goland, entitled "General Event Notification Architecture Base: Client to Arbiter", Internet Draft—draft-cohen-gena-client-00.txt (located at website http://www.upnp.org/download/draft-cohen-gena-client-01.txt), which is herein incorporated by reference in its entirety. As a result, the broadcast messaging may be performed utilizing a NTS value ACP Window ("ACP:Window") to multicast channel/port or the broadcast address. The value of NT in an ACP:Window request may be set to the service's service type, and the ACP:Window request may also include a USN header that is set to the ACP Configurator service's USN. It is appreciated that the NTS values, ACP Windows, NT values in an ACP:Window, and USN are fields that are defined by a GENA Notify method.

The ACP:Window requests may contain a Location and/or AL header. If there is no domain name server ("DNS") support available on the local area network ("LAN"), then a location may be provided utilizing an IP address of the ACP Configurator service. In addition, an ACP:Window notification may include a max-age header. Again, it is appreciated that the max-age header, Location header and AL header are also fields that are defined by a GENA Notify method.

In general, a response to an ACP:Window notification message may not be required.

An example of an ACP:Window notification message is shown, below, in Listing 1.

Listing 1.

```
NOTIFY * HTTP/1.1
Host: 239.255.255.250:1900
NT: ID:ACP
NTS: ACP:Window:1:1:0
USN: someuniqueid::ID: ACP
AL/Location: http://192.168.1.1:80/index.xml
Cache-Control: max-age = 60
```

The ACP:Window data field may include, for example, three numeric values separated by colons, and may have the following format: ACP:Window:ACPVersion:ACPWindowOpen:APRecentlyConfigured: (other values) where the values are show in the Listing 1 above.

As an example of operation, when an ACP Configurator sends an ACP Window notification message, the ACP Configurator may indicate this event to all STAs on the network, by broadcasting this information in a beacon IE or via the GENA Notify method, as described above. When an ACP Client device receives an ACP Window open indication message and the ACP Client device is in an ACP Activate mode, the ACP Client device may initiate messaging to the ACP Configurator by transmitting an initialization message to the ACP Configurator. This may be performed through an ACP Relay function, or possibly to the ACP Relay function, depending on the network technologies on either side of the ACP Relay function. It is appreciated by those skilled in the art that some network technologies do not require formal association before transmission of data packets in order to proceed to an authentication or configuration phase. If a formal association is required, the ACP Relay function and the ACP Client device may associate in order to complete the rest of the ACP messaging such as, for example, during authentication or configuration.

The initiation of the ACP window may be entered into via, for example, an external input such as, for example, the local pushing of a button on a gateway by a user, remote configuration, or out of band transfer of data such as, for example, a hardware device like a universal serial bus ("USB") drive, flash memory, etc.

The ACP approach may be implemented utilizing an Extensible Authentication Protocol ("EAP") such as described in the document by L. Blunk and J. Vollbrecht, entitled "PPP Extensible Authentication Protocol (EAP)", published as Internet Engineering task Force (IETF) RFC 2284, March 1998 or IEEE 802.1X, which is herein incorporated by reference in its entirety. Example components for an EAP include 1) an Authentication Server, 2) an Authenticator, and 3) a Peer or Supplicant. The ACP Configurator function may act, for example within an 802.11 network, as the Authentication Server and Authenticator for an Extensible Authentication Protocol (EAP), and the ACP Client function may act as the Supplicant.

In another example of an implementation of the invention, the ACP approach may utilize a discovery or configuration protocol such as:
1) Secure Easy Setup;
2) OASIS Simple Config;
3) 7C Simple Config;
4) Microsoft Link Layer Topology Discovery (LLTD);
5) Universal Plug and Play (UPnP); or
6) Digital Living Network Alliance (DLNA).

In another example of an implementation of the invention, this ACP approach may be applied to wired network devices. In wired LANs, Slave devices that communicate through a Master device may instead communicate directly to other Slave devices.

In general, the invention performs a process for transmitting data directly between a plurality of client network devices in a network having an access point device separate from the plurality of client network devices. The process includes receiving a broadcast message at a first client network device in the plurality of client network devices, wherein the broadcast message includes information indicating network capabilities of a second client network device in the plurality of client network devices. The process also includes determining the network capabilities of the second client network device in response to receiving the broadcast message, exchanging packet information with the second client network device based on the network capabilities of the second client network device, and establishing a direct communication path with the second client network device, wherein the direct communication path is a signal path that does not include the access point device.

Figure 4:
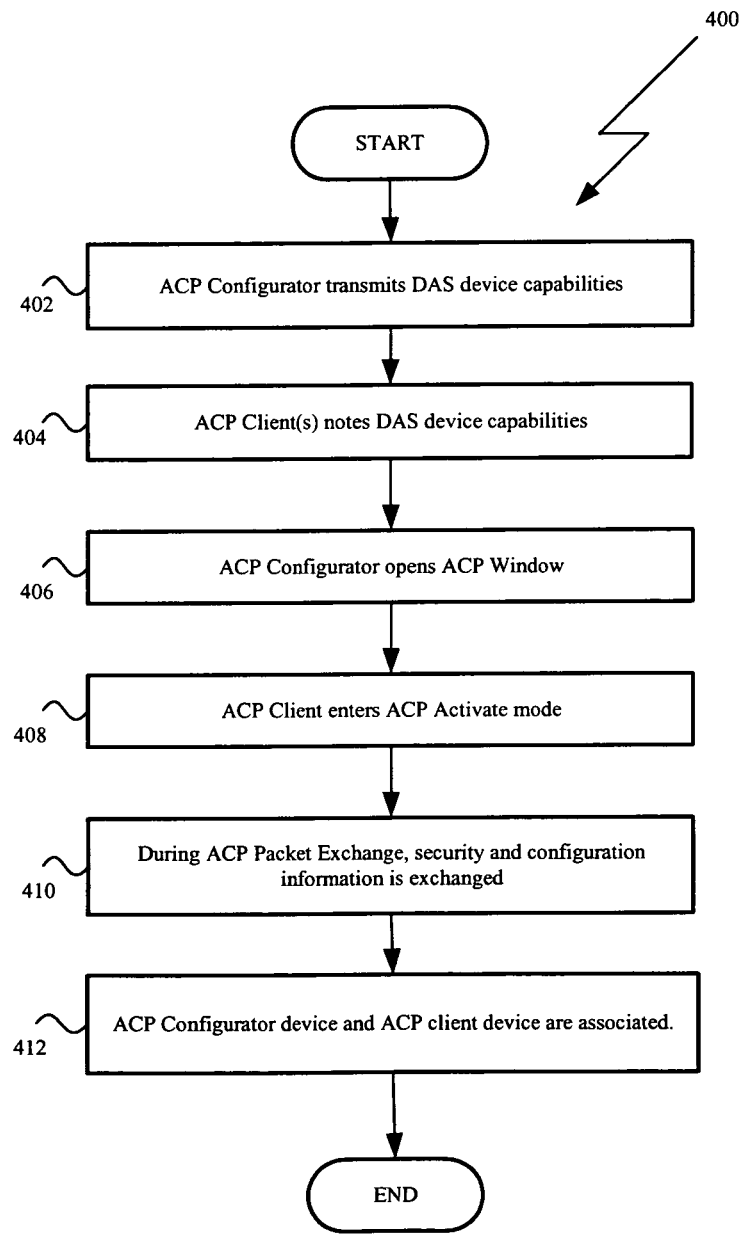
FIG. 4 shows a flow diagram illustrating an example of an implementation of a process for connecting multiple wireless devices, in accordance with the invention.

Turning to FIG. 4, a flow diagram 400 illustrating an example of a process for association of devices (including one or more DAS devices) is shown in accordance with the invention. The process starts in step 402, where an ACP Configurator in a network device broadcasts a message signal that indicates the capabilities of a network device. In step 404, one or more ACP Clients (in one or more other network devices) determine the contents of the ACP capabilities message in the message signal and, in step 406, the ACP Configurator enters the ACP Window state either by remote or local interaction (i.e., such as, for example, the pushing of a button). Similarly, in step 408, an ACP Client enters the ACP Active state either by remote or local interaction (i.e., again such as, for example, the pushing of a button). In step 410, security and configuration information is exchanged between the ACP Configurator and the ACP Client during an ACP Packet Exchange. During the ACP Packet Exchange, a "handshake" procedure may take place between the two devices after the second device has determined the capabilities of the first device from the broadcast message signal. In step 412, the ACP Configurator device and ACP client device are successfully associated and their roles as a STA or AP for this association have been established and the process ends. Additional optional steps may also include communicating initially with a third device that includes a traditional AP device.

The network capabilities may include the capability of utilizing an ACP and determining the network capabilities of the second client network device may include determining an ACP TLV from the broadcast message. The process may further include entering into an ACP Active state in response to determining the network capabilities of the second client network device. Exchanging packet information may include transmitting an initialization message to an ACP Configurator within the second client network device, wherein the transmitting of an initialization message may include utilizing an ACP Relay function.

Additionally, the process also may include entering into an ACP Window state at the second device after transmitting the broadcast message, wherein entering into an ACP Window state may be responsive to an external input.

Figure 5:
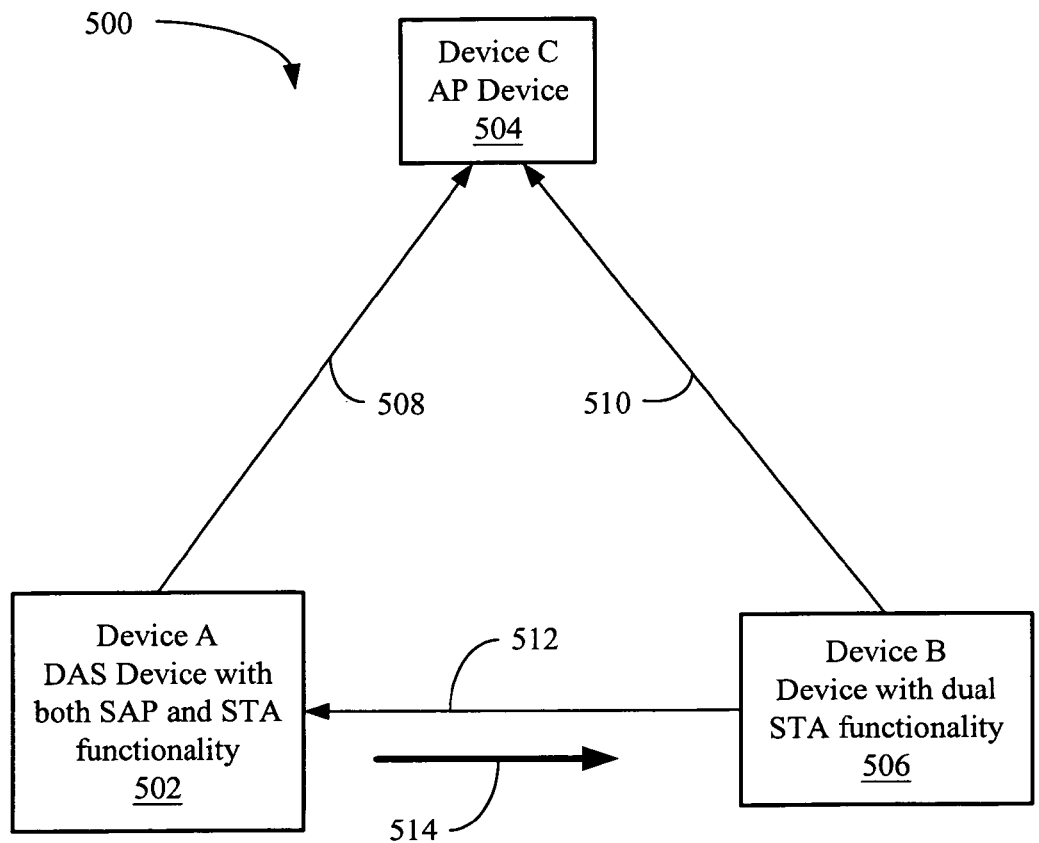
FIG. 5 shows a block diagram of an example of another implementation of the network architecture of the STDMD.

Turning to FIG. 5, a block diagram of an example of another implementation of the network architecture of the STDMD 500 is shown. Similar to FIG. 3, if Device A 502, within a STDMD 500, is a DAS device, then Device A 502 includes both AP and STA functionality. If Device A 502 operates as an AP and Device C 504 is an existing AP that is already part of the STDMD 500 system, then the AP of Device A 502 may be referred to as a subsidiary or secondary AP ("SAP"). The STDMD 500 may also include Device B 506 that may include dual STA functionality (i.e., two STA modules capable of communicating with two separate APs). Device B 506 may be a DAS device that also includes an AP functionality.

In an example of operation, Device A 502 may operate as an STA that is associated to and in signal communication with the AP of Device C 504 via signal path 508. Similarly, the first STA of Device B 506 may also be associated to and in signal communication with the AP of Device C 504 via signal path 510. Additionally, Device A 502 may also operate as a SAP that is associated to and in signal communication with the second STA of Device B 506 via signal path 512. Data stream signals 514 may then be sent from Device A 502 to Device B 506 via signal path 512 utilizing known STA-AP protocols. Device A 502 may be a MMS and Device B 506 may be a MMK.

As an example, if Device A 502 is an MMS, then Device A 502 generally would be implemented as a device that is attached to wall power, and therefore, well-suited to becoming a SAP in order to allow client multi-media devices to associate with it for the purpose of receiving multimedia streams. When such a device decides to become an SAP, it too, would like to maintain a connection to the original AP, and as such, would implement a STA function which then associates with the original AP. Alternatively, such a device may have a wired network connection which provides a connection to the existing AP and or existing WAN port. In such a case, the MMS would typically act only as an SAP.

A STA that maintains multiple associations is free to route any traffic to either of the associated APs, as is appropriate. For example, a STA that is associated to a legacy AP for Internet connection purposes may receive HTTP messages over TCP/IP from the legacy AP and then generate and send TCP/IP ACK segments back toward the legacy AP for eventual delivery to the TCP sender. At the same time, the same device may be receiving a multimedia stream from an SAP over a separate TCP/IP session. The STA generates TCP/IP ACK segments for that separate flow and sends those packets toward the SAP instead of the legacy AP. Each path is a direct path, requiring no additional transmissions on the WLAN to reach its destination.

Figure 6:
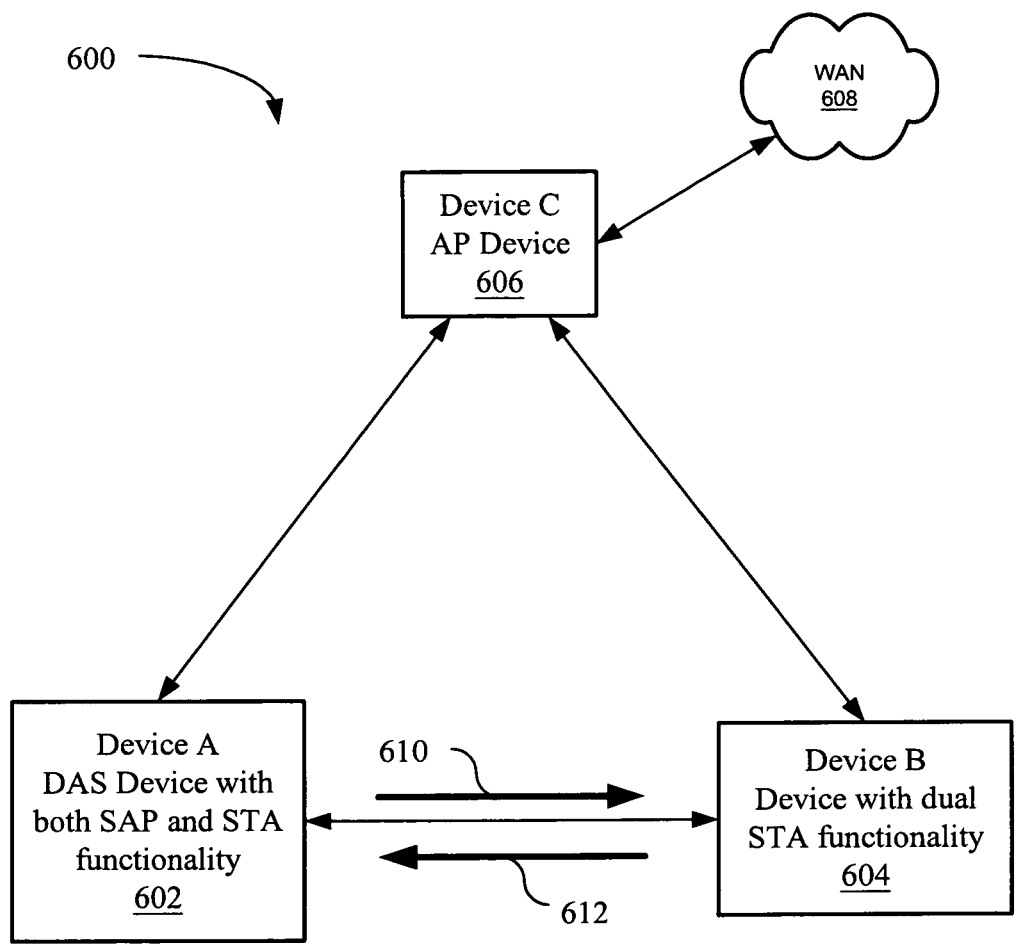
FIG. 6 shows a block diagram of an example of yet another implementation of the network architecture of the STDMD.

In FIG. 6, a block diagram of an example of yet another implementation of the network architecture of the STDMD 600 is shown. As an example the STDMD 600 is shown including Device A 602, Device B 604, and Device C 606. Device A 602 may be a DAS-enabled device with both SAP and STA functionality and Device C 606 may be a legacy AP device connected to a WAN 608 such as, for example, an Ethernet or the Internet. Device B 604 may be a device with dual STA functionality. As examples, Device A 602 may be a MMS and Device B 604 may be a MMK.

In an example of operation, a STA in Device B 604 may establish an active TCP session with a STA in Device A 602 by first establishing an active TCP session that is routed through the AP in Device C 606 to Device A 602. Device A 602 may utilize a TCP acknowledgement ("ACK") signal 610 and Device B 604 may respond with a TCP data signal 612. The STA of Device B 604 may establish an active TCP session with the STA of Device A 602 that is routed through the AP of Device C, the STA of Device B is then able to establish a session with the AP of Device A 602 utilizing an ordinary STA-AP protocol.

Typically, SAP devices announce their capability and functioning as a SAP. An SAP-capable device which is not operating as an SAP should not announce that it is functioning as an SAP, but it may announce its capability to perform SAP functionality.

SAP devices may exist on a channel where an existing AP (or SAP) already exists. In such cases, the SAP device may send management action frames of a category "DAS" that are not beacons, but which include all of the fields normally contained within a beacon, in order to announce their presence. This prevents an existing AP from determining that the channel is occupied by another AP if it were to detect a beacon, and then might have invoked dynamic frequency selection ("DFS") to move itself and its BSS to a different channel in order to reduce possible congestion on the current channel. In some situations, DFS-initiated BSS channel changes may be advantageous, but when a DAS device wishes to operate both as a STA and an SAP, the DAS device requires that the original AP remain on the current channel to allow it to maintain a STA association with that AP, while at the same time, offering itself as an SAP to other devices. By having the SAP send a management action frame of category DAS and action of "beacon" instead of sending a normal "beacon frame," the probability of a DFS-induced channel change is reduced and only one radio is needed by the DAS device to maintain its status as both SAP and STA.

Figure 7:
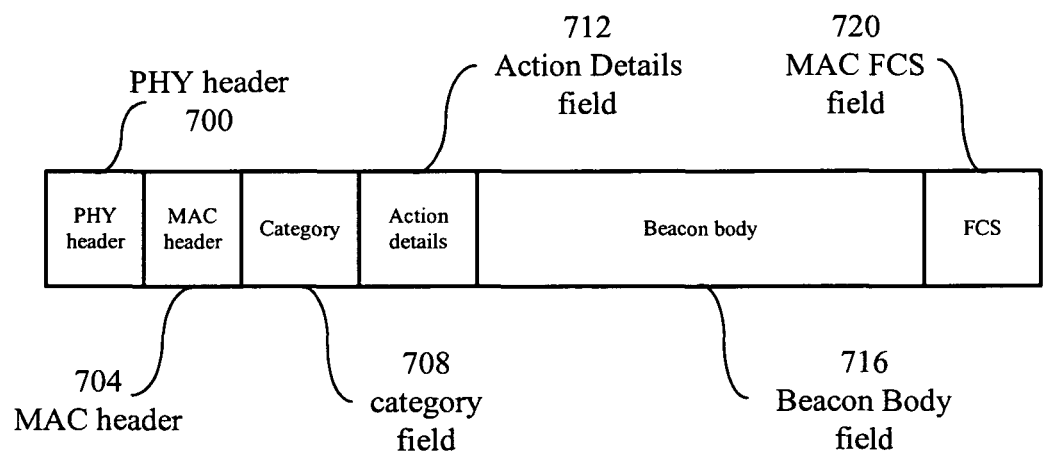
FIG. 7 shows an example of a format of the management action frame of category DAS utilized to carry an SAP beacon.

In FIG. 7, an example of a format of the management action frame of category DAS utilized to carry an SAP beacon is shown. As an optional example, with reference to FIG. 7, the PHY Header 700 may include the physical layer transmission bit rate, the length of the frame, and other information that relates to the PHY operations required to decode the frame. The MAC header 704 may indicate the frame type, such as management action, and provides MAC addressing information, as well as providing other information which relates to MAC operations. The category field 708 as is present in a management action frame, indicates which category of management action frame is present, for example, QoS management action. A specific management action category or multiple categories are chosen to allow the conveyance of a beacon frame body within a management action frame. The action details field 712, includes a further division of the management action category to allow the distinction between other subtypes and the type which carries the beacon body. For example, one action details field of the QoS action category might have the meaning of transmission stream descriptor and another might have the meaning of beacon frame body present. The beacon body field 716 is present only when the specifically chosen management action category field 708 value and the action details field 712 value together express the condition that a beacon frame body is present. The beacon body 716 in such cases is similar to the body of a beacon management frame that is normally otherwise targeted for transmission at regular intervals by a typical AP, the differences between them having been noted earlier. The MAC FCS field 720 may optionally provide a cyclic redundancy check on the contents of the frame, excluding the PHY header, in order to allow for error detection.

It is still possible that by observing data traffic on its channel, an existing AP might determine that an overlapping BSS is operating in the vicinity, on the same channel. The existing AP might reach this conclusion for example, by intercepting frames which have the ToDS bit set, but which are not addressed to itself. Even if the SAP and its associated STA were to use the IBSS combination of ToDS=0 and FromDS=0, it is quite possible that the existing AP would still interpret the intercepted frames as belonging to an overlapping BSS which it simply assumes is an IBSS instead of an infrastructure BSS. The BSS field (address3 field) might be used to assist in this determination.

If the SAP-capable DAS device is operating as an SAP on a channel where no other nearby AP exists, then the SAP device needs to send a normal beacon to avoid the problem of having another AP arrive on that channel and, seeing no beaconing, decide that the channel is free. If a newly-arriving AP were to assume that the channel was free, then it might attempt to set up a new BSS on that channel, not realizing that an SAP is already operating a BSS on the same channel. In this case, the SAP must send a normal beacon. However, this too, creates a potential problem, since a legacy STA might arrive on the channel during a scanning operation and upon discovery of the beaconing, decide to attempt to associate with the SAP. To avoid this, the SAP may prefer to restrict associations to those devices which are DAS capable in order to use the association as a means of controlling the amount and type of traffic that can occupy the channel on which the SAP BSS operates. Furthermore, the SAP includes a power save operation mechanism which requires the cooperation of all BSS members (even those not directly participating in the power save mechanism). The legacy STA will not be aware of this behaviour, and as such, may interfere with the best operation of the power save mechanism. The SAP may refuse to associate a legacy STA which attempts association, but this may not completely discourage the requesting STA, which may return at a later time and re-attempt association. Each of these attempts causes bandwidth loss for the BSS and delays in establishing an association for the legacy STA device. Therefore, it is much preferred to discourage the scanning legacy STA from even attempting association by advertising a condition for BSS membership which is correctly "interpretable" by the legacy STA as disallowing it from joining the BSS. An example mechanism to achieve this is for the SAP to advertise a BSS Basic Rate which is a non-existent physical layer transmission bit rate. In this example, all potential members to a BSS must support all BSS Basic Rates. But because there exists a BSS Basic Rate in the SAP beacon which is unsupportable by the legacy STA device, i.e. the nonexistent rate, the legacy STA device should decide that it cannot meet the minimum requirements for membership, and therefore, will not attempt to join the BSS of the SAP.

Figure 8:
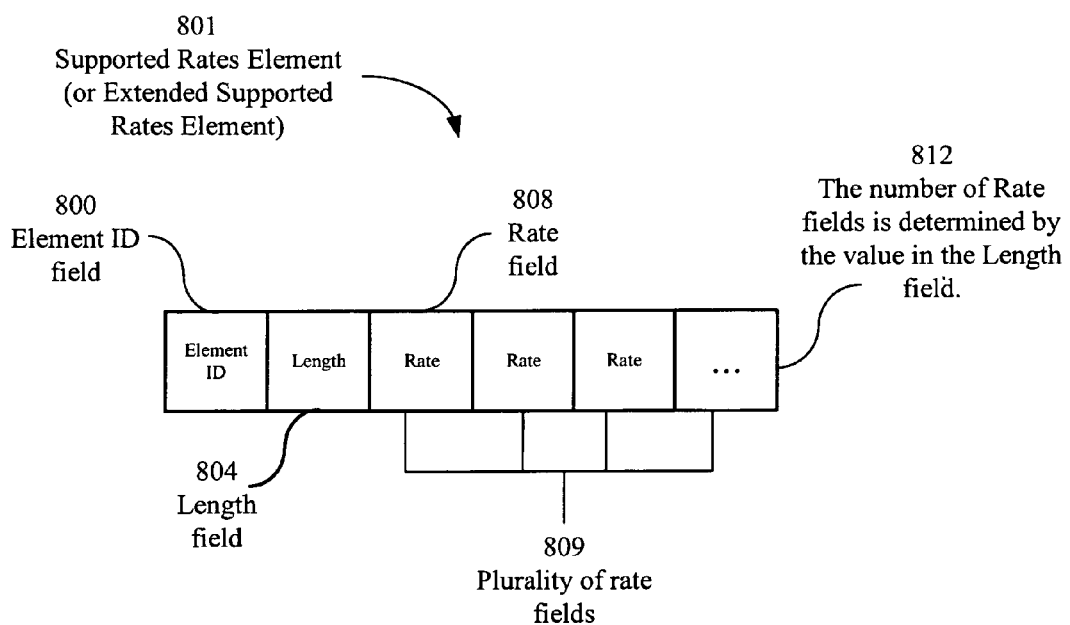
FIG. 8 shows an example of a format of a supported rates element or extended supported rates element that may be utilized to describe the BSS Basic Rate set, which is utilized by STAs desiring association to determine whether the AP sending the supported rates element is a valid candidate for association.

FIG. 8 shows an example of a format of a supported rates element or extended supported rates element 801 that may be utilized to describe the BSS Basic Rate set, that is used by STAs desiring association to determine whether the AP sending the supported rates element is a valid candidate for association. The supported rates element shown in FIG. 8 is typically transmitted within beacons, as a portion of the body of the beacon frame. With reference to FIG. 8, the element ID field 800 is utilized to distinguish this element from other possible elements that may be transmitted as part of a management frame that contains elements, such as a beacon frame. The element ID field 800 value is unique to each type of element that may be present, with one specific value for example, being assigned to the supported rates element. The length field 804 is used to indicate the number of bytes contained in the element. By examining the length field 804 value, it is possible to determine how many rates are indicated in the supported rates element as is indicated in FIG. 8, item 812. The rate field 808 contains a value which is interpreted by the receiver as indicative of a rate that is supported by the transmitter of the element. A plurality of rate fields may be present as is indicated in item 809 of FIG. 8.

Figure 9:
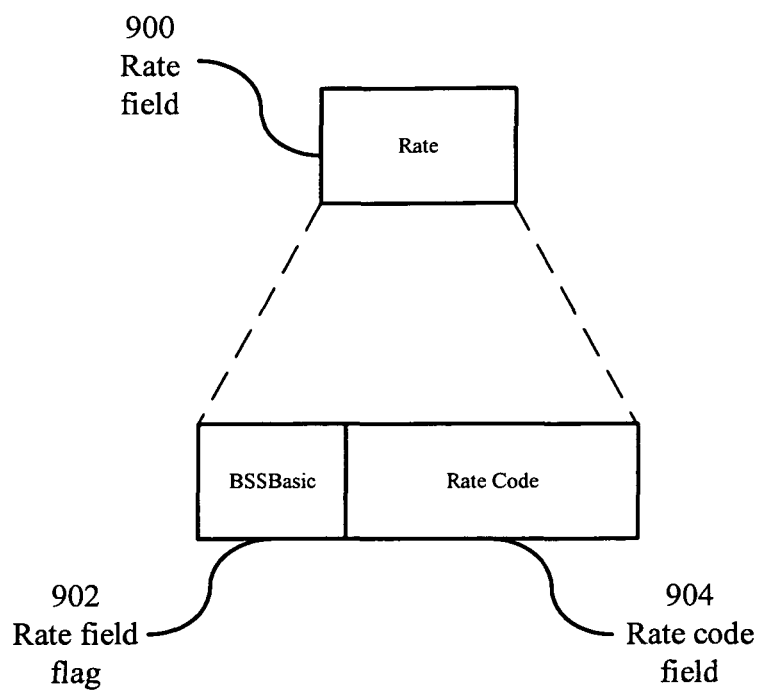
FIG. 9 shows more detail of the rate field shown in FIG. 8.

Turning to FIG. 9, which shows more detail of the rate field 808 from FIG. 8, each rate field 808 or rate field 900, includes a rate field flag 902, which indicates whether the rate that is encoded in the rate code field 904, is part of the BSS Basic Rate set, which defines the minimum support requirements of a STA which wishes to associate with the AP or SAP that transmits the supported rates element or extended supported rates element. As optional examples, the rate field flag 902 may have a length of one bit and the rate code field 904 may have a length of 7 bits.

Other elements may be similar to the supported rates element in their ability to convey mandatory BSS membership requirements, such as the extended supported rates element. The invention does not discriminate as to which element is used for the purpose of advertising a "non-rate" supported rate to STAs that are considering a possible association with the AP which transmits frames containing the element.

DAS protocol provides a special rate code value that is either a value signifying an actual physical transmission bit rate, but which is not a rate which is supported by any previous, i.e. legacy, STA, but is a rate which is supported by DAS STA, or alternatively, is a value that does not represent an actual physical transmission bit rate, but rather, indicates that additional potential requirements for BSS membership are found in another location within the frame that carries this rate element. A DAS STA will interpret the special rate code value in a different manner than legacy STA. A DAS STA will recognize the advertised BSS Basic Rate non-existent rate not as a rate, but rather, as an indication that elsewhere in the beacon (in another element) will be found a further set of minimum membership conditions. The DAS STA will compare the normally indicated minimum membership conditions plus the extra minimum membership conditions to its own capabilities before making a decision to attempt association to the SAP. Even some DAS STA devices might lack some capabilities that are indicated in the minimum membership requirements by the SAP device. Some capabilities may be optional, while others may simply be capabilities that were defined after the implementation of the device seeking an SAP (or AP) with which to associate. Legacy, i.e. non-DAS, STA which do not understand DAS protocol will correctly interpret the special rate code value as a requirement of support for a physical transmission bit rate which they do not support and will, as a result, not attempt an association with the advertising device.

Figure 10:
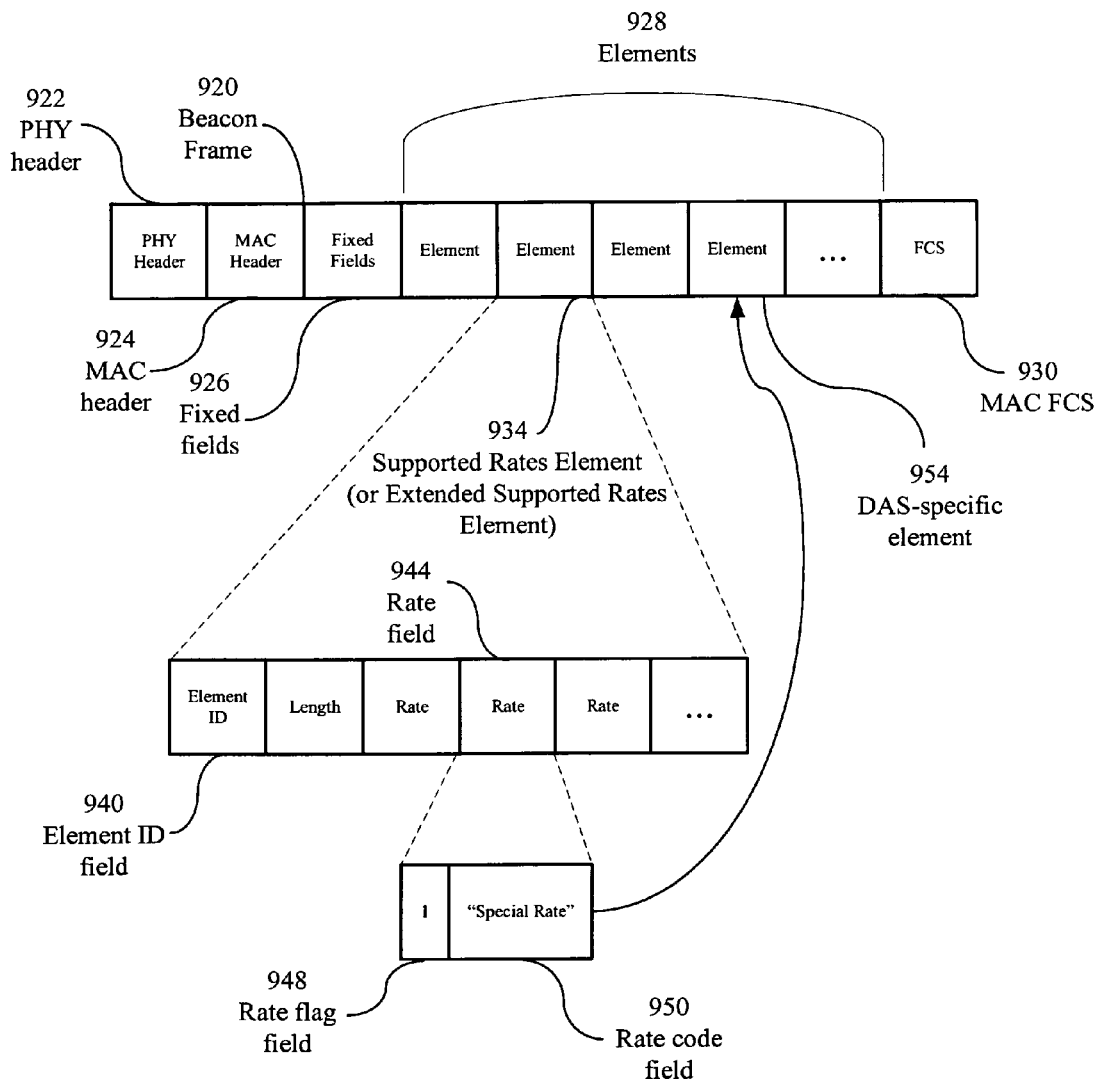
FIG. 10 shows an example of a beacon frame, which may include a special rate code value in a supported rates element.

FIG. 10 shows an example of a beacon frame, which may include a special rate code value in a supported rates element. The beacon frame 920 may include a PHY header 922, a MAC header 924, a set of fixed fields 926, a MAC FCS field 930 and a set of elements, 928. In the example shown in FIG. 10, the second element 934, after the fixed fields, is a supported rates element or extended supported rates element. Taking the example further, in the case of the second element 934 being a supported rates element, then the element ID field 940 contains a value that identifies the subsequent bytes as part of the supported rates element. The rate field 944 from the plurality of rate fields shown for the supported rates element is further expanded to show the rate flag field 948 and the rate code field 950. In this example, the rate flag field 948 contains a value which indicates that the rate code field 950 is part of the BSS Basic Rate set, meaning that a STA that desires to associate with the AP (or STA) that transmits the frame which contains this supported rates element must be able to support the rate which is found in the rate code field 950. In this example, the rate code field 950 contains the special rate code value that indicates that additional requirements for membership beyond the BSS Basic Rate set are included in other elements, or may not be included in other elements, but in either case, causes a non-DAS STA to determine that the BSS Basic Rate set includes a rate which is not supported by the non-DAS STA. The DAS-specific element 954 is an example of an element that contains additional feature and rate advertisements, some, none or all of which might be requirements for membership in the BSS.

In some instances, the SAP may decide to allow non-DAS STA to associate, in which case, the SAP should not include the special rate code value in its supported rates element or extended supported rates element.

In some instances, the SAP may decide not to allow a STA to associate to, either a DAS STA or a non-DAS STA, even if the minimum membership requirements are met, because the SAP may not have enough remaining bandwidth in the SAP BSS to support the additional traffic load that would be created by the STA requesting association. For example, the SAP could return a reason code of "dissociated because QAP lacks sufficient bandwidth for this QSTA."

The SAP uses the same Time Synchronization Function (TSF) as is used by the existing AP, with the SAPs TSF value and TSF clock rate matching the value and clock rate of the existing AP's TSF, in order to facilitate power saving and QOS schedule coordination and channel excursions between the AP and the SAP. If the SAP wishes to use another, secondary channel for the SAP BSS operation, it may employ any of various power save techniques to absent itself from the primary AP's channel to perform SAP duties on the SAP BSS channel. STA associated with the SAP and operating on the secondary channel will be informed of the proper schedule for their activity on that channel through messaging sent by the SAP on that channel, for example, as schedule elements in frames transmitted by the SAP. By sharing the TSF between the two BSS's, all of these tasks are made much simpler.

SAP Target Beacon Transmission Times (TBTT) may be shifted from primary AP TBTTs in order to again, simplify the tasks of keeping track of the multiple associations on the part of the STA and in order to allow the SAP to be absent from the primary network at appropriate times. Because an SAP is subsidiary to the primary AP, the SAP may schedule any wake times intended for its associated STA to be outside of the expected scheduled times advertised by the primary AP. The associated STA may find it necessary to retransmit received schedule elements from the primary AP to the SAP in order to provide the knowledge of scheduled activity in the primary BSS to the SAP.

Figure 11:
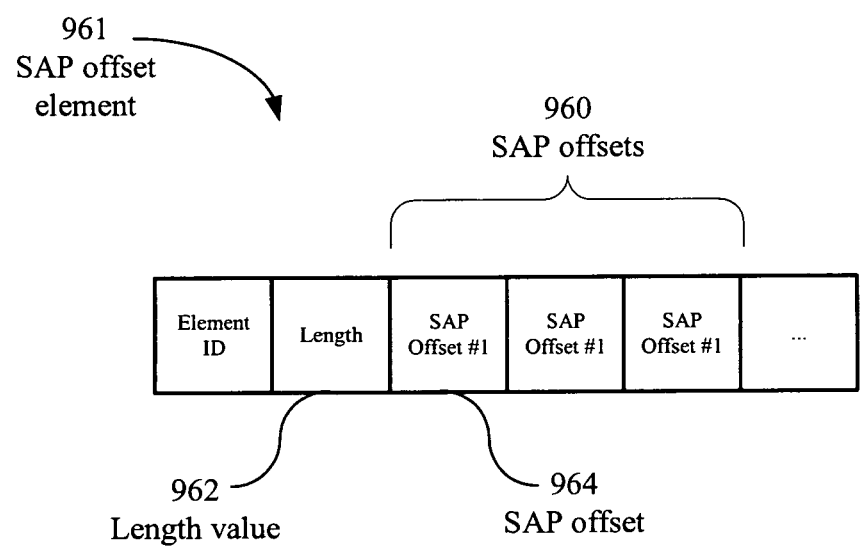
FIG. 11 shows an example SAP offset element that includes a list of SAP offsets, with a length value, to indicate how many offsets are in the list.

The primary AP, where possible, may retransmit offset values for each associated SAP in order to allow SAPs to avoid scheduling their offsets simultaneously. This is done by placing the offset information for each of the SAP devices into an element 961 in FIG. 11, created for this purpose. As shown in FIG. 11, the element contains a list of SAP offsets 960, with a length value 962, to indicate how many offsets are in the list. Each SAP offset value 964 contains an SAP identifier and a time offset that describes the offset of the given SAP identifier's TBTT from the sender's TBTT. APs that are not aware of the existence of this element or of SAPs will not be able to transmit this new element. SAPs may transmit SAP offset elements.

Power save activity in the SAP will need to include some aspect of scheduling for some scenarios, and as such, a shared TSF value makes this task simpler. Providing a list of the SAP TBTT offset times helps each AP and SAP determine the best times to schedule power saving and QOS schedules.

When an AP or STA or SAP desires to switch to another channel for any of various purposes, including scanning, channel monitoring, data transfer, among others, the provision for coordinated TSF times allows AP, SAP and STA devices to avoid performing these functions when desired data transfers are expected to be occurring. For example, an AP or SAP could switch to an alternative channel for monitoring purposes at a time when it determines that an exchange between the associated AP and a different STA is scheduled to occur. This activity is facilitated by the coordinated TSF functions.

Either the SAP or a DAS-capable device acting as a STA may operate in a power save mode. While in a power save mode, the device can switch between an active state and a sleep state. While in the active state, the device is capable of receiving transmissions on the WLAN medium and is capable of transmitting frames to the WLAN medium and it is capable also of monitoring activity on the channel and maintaining a sense of the current state of the medium and of the WLAN network functions. When the device is in a sleep state, it generally is no longer able to participate in the activity occurring on the medium, but is able to reduce its power consumption significantly as a result. A device in sleep state may be able to track some channel condition state, for example, it may be able to count a non-zero NAV or a non-idle CCA indication. Tracking of these conditions may not be 100% accurate. For example, a non-zero NAV setting that is being counted down may be cancelled (reset to zero) before counting down to zero by a network event. If the device is in sleep state, it is likely that it is unable to detect the network event which causes a NAV reset, and hence, the power save device's NAV state information will be incorrect.

In order to allow the various members of a BSS to communicate with each other while any one or more of them are actively switching between an active state and a sleep state, there needs to be some coordination between the devices regarding the times when each device is in either state. If either device is unaware of the current power saving state of the other device, then attempts to exchange frames may or may not be successful. The devices should attempt to coordinate their wake state in order to allow maximally efficient network operation. This coordination is traditionally achieved in any of several manners:

1) one device is always awake, and provides a periodic message which indicates whether it wishes to engage in communication with a device which might be in the sleep state, the power saving device should wake at the periodic message times in order to determine if it should be awake for a longer period of time which would permit the exchange of frames—if the power saving device decides to allow communication, it informs the always awake device that it has made the transition from sleep state to wake state and normal communication can ensue—when the power save mode device wishes to return to the sleep state, it again informs the always awake device that it has done so—the sleep state device may, through a local decision, make the transition from sleep state to wake state and again, informs the awake device of this fact to allow communication to occur—additionally, the sleep state device may transmit frames to the always awake device at any time, even without making an explicit indication that it is in the awake state, because the recipient device is always awake, the recipient device, in this case, cannot assume that the sleep state device is in the wake state, because it has not announced that fact, and as a result, this allows the sleep state device the ability to immediately (following the completion of its attempt to exchange frames) return to the sleep state.

2) a mechanism similar to that described in 1) above, but with the exception that rather than making a complete transition to the wake state, the power save device sends a frame that is a request for delivery of one of the frames which is stored at the always awake device and intended for delivery to the power save device—when one frame from the set of stored frames for delivery to the power save device has been successfully transmitted to the power save device, the power save device has the option to either return to the sleep state, or send another frame that is a request for delivery of one of the frames which is stored at the always awake device and intended for delivery to the power save device—in any case, the always awake device only assumes that the power save device is awake when it receives an explicit request for the transfer of a single frame.

3) a mechanism similar to the one described in 2) above, but with the modification that the always-awake device may send more than one stored frame to the power save device in response to the request—because the power save device is unaware of the total time necessary to stay awake to receive frames, it simply stays awake and receives frames until the always awake device signals permission to the power save device to return to the sleep state.

4) a mechanism wherein both devices may be power save devices, but where both devices wake at a periodic interval for a period of announcements which is coordinated to coincide with all other devices—during this common wake time, all devices that wish to communicate with another device attempt to inform the other device of their intention—at the end of a prescribed period of time, all devices that either sent or received a message indicating that the device is intended to be either the transmitter or receiver of some frames will remain awake to allow frame exchanges to occur and remain awake until the next periodic announcement interval ends, unless again called upon to participate in a frame exchange.

Various of these power save mechanisms are suitable for various combinations of APs, SAPs, and STAs. Assuming that the SAP is not restricted in its use of power (e.g., it is connected to a continuous source of power), then the traditional power savings mechanisms described above are still applicable, with the STA responding to messages from both APs and SAPs and the STA providing power saving mode transition information and power saving state transition information to both APs and SAPs. Examples of possible power save mechanisms that can be deployed by continuous-powered SAP devices include:

1) System uses S-APSD, as negotiated by TSPEC; where S-APSD and TSPEC are as defined in the 802.11 standard which incorporates the 802.11 e amendment and further refined within the Wi-Fi Alliance WMM specification and test documentation.

2) System uses S-APSD, as defined by device class, wherein a given service class is assigned to a given schedule for performing data transfers, and all devices with traffic of a given traffic class to be transmitted or received must be awake at the scheduled time for that service class; and 3) System uses PS-Poll, U-APSD or PSMP style exchange; where PS-Poll and U-APSD is as defined in the IEEE 802.11 standard that incorporates the IEEE 802.11e amendment and further refined within the Wi-Fi Alliance WMM specification and test documentation, and PSMP is as defined in the IEEE 802.11n draft of the TGn task group of the 802.11 working group of the IEEE Standards Association, where PS-Poll stands for Power Save Poll, U-APSD stands for Unscheduled Automatic Power Save Delivery, S-APSD stands for Scheduled Automatic Power Save Delivery, and PSMP stands for Power Save Multi Poll.

However, for the case when the SAP and STA are both battery powered devices (e.g., two handheld multimedia devices wishing to exchange a multimedia stream), then it is necessary to describe an additional, new power saving mechanism to cover the case of an SAP acting in power save mode. Fundamentally, the SAP now also has the ability to enter a power saving mode and make transitions from the wake to sleep state and vice versa.

If the SAP and STA have exchanged TSPECs that include scheduled access, then the SAP will set up a scheduled time during which both the STA and the SAP will be awake and provide this schedule in a SCHEDULE element sent to the STA. Because the SAP advertises itself as being a power save device, the STA recognizes that the SAP will only be awake during the advertised times.

In the absence of an agreed upon TSPEC, an SAP may create and send an unsolicited SCHEDULE element, where unsolicited means that no IEEE 802.11 TSPEC exchange has occurred, to each associated STA in order to indicate an agreed-upon time during which the STA and the SAP will both be awake. For example, in FIG. 12, an unsolicited schedule element 230 is transmitted by a power-saving SAP to a STA so that the SAP and the STA may establish a common time period for frame exchange when both the SAP and the STA will be awake. Alternatively, the SAP may be a power saving device and the STA is not a power saving device. In this alternative case, the prior-art power save mechanisms still fail to provide the needed service, but the method described here provides the required elements to allow successful packet exchange. Alternatively, the SAP may not be a power saving device, but the STA is a power saving device. In this case, prior-art power save mechanisms may provide the needed service, but the invention will serve the purpose as well.

Turning back to FIG. 12, within the schedule element 230, the element ID field 232 contains a value which uniquely identifies the schedule element. The length field 234 contains a value which indicates the length of the element. The service start time field 244 indicates the anticipated time when the unsolicited scheduled service period begins, that is, the time when the SAP will be awake from its sleep state in order to be able to exchange frames with the STA for which the schedule element is intended, as indicated by the MAC header receive address field of the frame which contains the schedule element. The service start time field 244 value is commonly related to the TSF value for easy reference to a common time clock, i.e., it is commonly expressed as some portion of the lower bits of the TSF time value. The service interval field 246 indicates the time between two successive unsolicited scheduled service periods. All non-first service periods begin on an integer multiple of the service interval field 246 from the service start time field 244 value. For the unsolicited schedule element, the specification interval field 248 contains the nominal duration of the scheduled service period, beyond which each of the SAP and the STA can no longer guarantee that the other device is still in the awake state.

Figure 12:
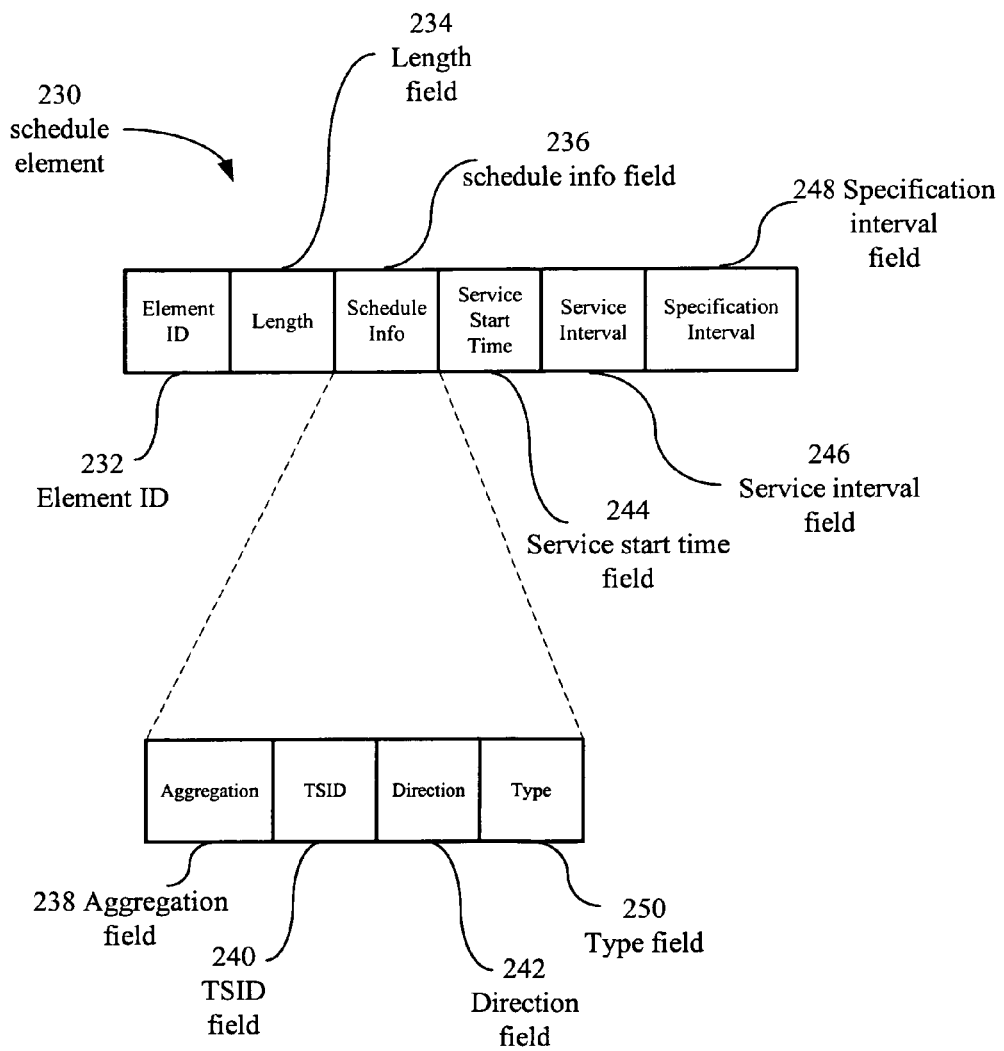
FIG. 12 shows an example of an unsolicited schedule element that is transmitted by a power-saving SAP to a STA so that the SAP and the STA may establish a common time period for frame exchange when both the SAP and the STA will be awake.

Continuing with FIG. 12, for a solicited schedule element, the schedule info field 236 is further expanded to show the subfields aggregation 238, which is not used to indicate whether the service period being indicated in the schedule element allows packets from more than one TSID (TSPEC Identifier) to be exchanged within the service period described by the schedule element. For the unsolicited schedule element case, there is no TSPEC corresponding to the schedule element, and hence, the aggregation field is not used. The same discussion applies to the direction field 242. However, for the TSID field 240, the type field 250 is used to signal that the schedule element is an unsolicited schedule element (so as to account for the possibility that some TSPECs may have been exchanged) and also is used to encode a message type within the unsolicited schedule type. There are three possible message types, and hence, three valid codes for the type field:
1. Unsolicited schedule request;
2. Unsolicited schedule reject; and
3. Unsolicited schedule accept.

Figure 13:
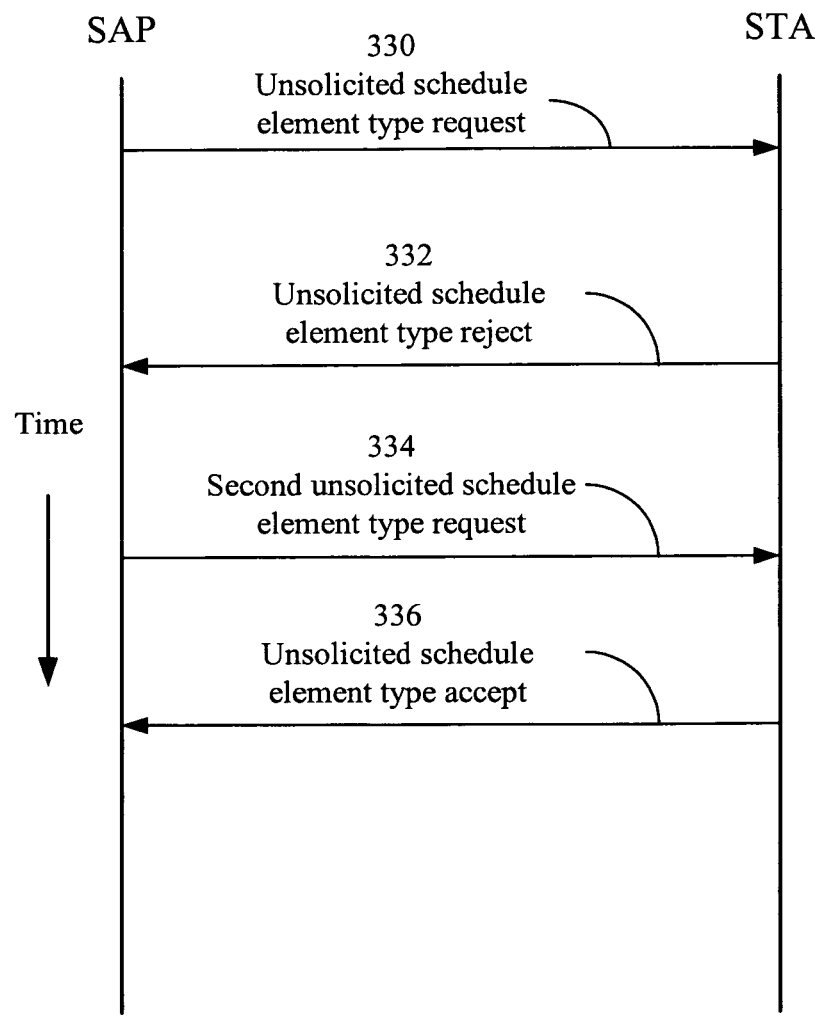
FIG. 13 shows a signal flow diagram of an example of an exchange of an unsolicited schedule element request type that is sent from an SAP to a STA.

A schedule element signalling an unsolicited schedule request type value in the type field 250 requires the return of an unsolicited schedule accept type within a returned schedule element before the start of the service period as indicated in the service start time field 244. If the returned schedule element is not received before the service start time field 244 value, then the service schedule is not valid. A respondent may return a message of type unsolicited schedule reject instead of an unsolicited schedule accept, if for example, the indicated service period in the request message is expected to take place when the STA expects to be asleep or engaged in scheduled communications with another BSS or operating on a different channel. The message type unsolicited schedule reject may contain an alternative value for at least one of the service start time field 244, the service interval field 246 and the specification interval field 248. If a message type reject is received, then a new message type request must be made in order to solicit an accept message before a service period agreement is in effect. FIG. 13 shows an exchange of an unsolicited schedule element request type 330 that is sent from an SAP to a STA. The STA responds with a message of type reject 332 followed by a new request type 334 from the SAP. The STA responds to the second request with a message of type accept 336.

For the unsolicited schedule element, a value of ZERO in the specification interval field 248 of FIG. 12 in a message type of reject indicates that the STA or SAP transmitting the reject message does not wish to engage in a scheduled service period with the requesting STA or SAP.

In the absence of a TSPEC exchange, the SAP device may determine the schedule values according to the type of device that is advertised by the associating STA in its DEVICE TYPE element. For example, video devices would receive one style of schedule, and audio devices a different style of schedule. The schedule would then be transmitted within an unsolicited schedule element if either the target or source device employs a power saving mode.

Default schedules may be created instead, according to EDCA traffic class. Traffic class-based schedules are defined by setting the TSID to the EDCA class in question with the aggregation bit set to 0. Such schedules may be shared by all STA (multi-STA) associated with the SAP or may be directed individually to STA. The SAP may change the schedules for each traffic class as it desires and send update messages to indicate the schedule change. In an example of the multi-STA approach, the SAP may modify the schedule for a given class which is sent to all STA in order to accommodate a fluctuating number of multiple STA within a single class-based scheduled time period, or a fluctuating load from a fixed number of STA, or a combination of both. Typically, multi-device class-based schedules would be sent to all STA simultaneously within a multicast or broadcast transmission. Individual STA may receive individualized class-based schedules typically within unicast frames. Individualized schedules do not need to overlap, but they may. The schedule would then be transmitted within an unsolicited schedule element if either the target or source device employs a power saving mode.

Figure 14:
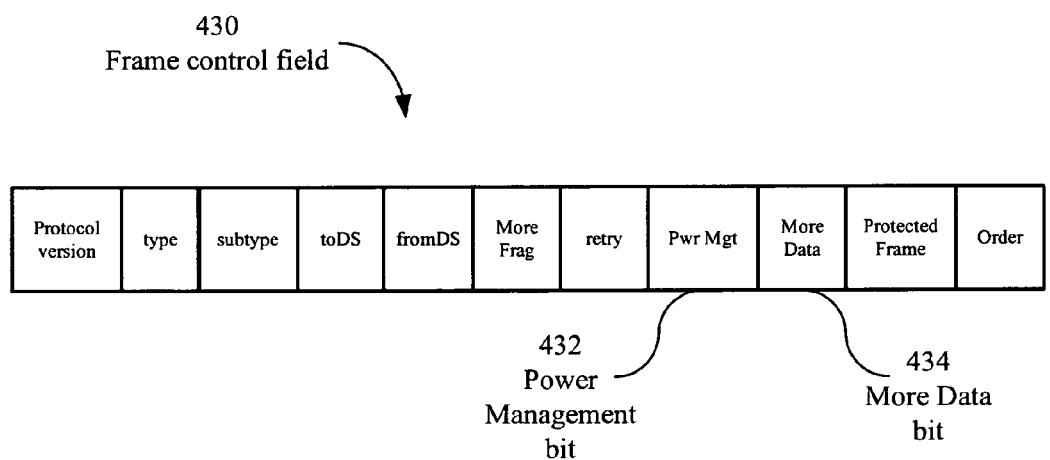
FIG. 14 shows an example of a frame control field of an IEEE 802.11 MAC frame format as utilized in the present invention.
Figure 15:
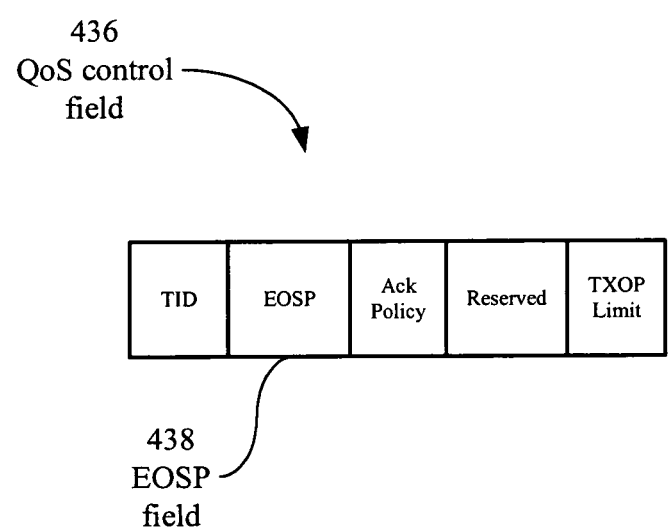
FIG. 15 shows an example of a Quality of Service ("QoS") control field of an IEEE 802.11 MAC frame format as utilized in the present invention.

When an SAP advertises itself as being a power save device, for example, by setting the power management bit 432 to "1" within, for example, the frame control field 430 of the IEEE 802.11 MAC frame format as shown in FIG. 14, the STA recognizes that the SAP will only be awake during the advertised schedule times. An exception is that if the STA advertises, within its scheduled service time, no MORE traffic in a transmission (as described within the 802.11 standard including the 802.11e amendment and further refined within the Wi-Fi Alliance WMM specification and test documentation and generally accomplished by setting the More Data bit 434 to "0" within, for example, the frame control field 430 of the IEEE 802.11 MAC frame format as shown in FIG. 14) then the SAP may return to a sleep state. A similar argument is true for the reverse relationship—that is, if the STA receives a MORE traffic indication from the SAP, generally accomplished by setting the More Data bit 434 to "1" within, for example, the frame control field 430 of the IEEE 802.11 MAC frame format as shown in FIG. 14, during a scheduled period of time, then the STA remains awake until it sees no further MORE traffic indication, or until the next scheduled time period ends with no traffic received, or the STA stays awake until it sees the End of Service Period ("EOSP") bit 438 set to "1" within, for example, the QoS Control field 436 of the IEEE 802.11 MAC frame format as shown in FIG. 15 within a frame transmitted by to it from the SAP. Regardless of these indications, either a STA or an SAP may remain awake for other purposes.

More than one SAP may connect to a single AP. This creates complications for scheduling of activity at each of the SAP devices that is reduced by having all SAP share one TSF with the original AP. SAP devices may coordinate further by sharing class-based schedules.

These same mechanisms may be deployed by an SAP that is not in power save mode. By employing these mechanisms, the SAP may be produced with much less complex functionality than is required to implement a complete TSPEC-based solution.

The SAP, because of its shared TSF function, can coordinate wake times with respect to the original AP TBTT times when both are on the same channel, allowing those STA that wake for the AP to share that wake time with the SAP and to therefore minimize overall power consumption.

Because the relationship between the MMK and MMS is equivalent to that between an AP and a STA in a traditional WLAN network, it is possible for multiple MMK, for example, to act each as STA, with each creating an association with the MMS (acting as an SAP) and as such, the SAP may transmit packets that are targeted toward a multicast destination, where, for example, any or all of the associated MMK STA may receive the multicast packets. A method to send packets to a multicast address is not possible within the context of the 802.11e DLS mechanism.

Persons skilled in the art will understand and appreciate, that one or more processes, sub-processes, or process steps described may be performed by hardware or software, or both. Additionally, the invention may be implemented completely in software that would be executed within a microprocessor, general-purpose processor, combination of processors, DSP, or ASIC. The invention may be realized in a centralized fashion in at least one computer system, or in a distributed fashion where different elements are spread across several interconnected computer systems. If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A method for transmitting data directly between a plurality of Dual Access Point and Station ("DAS")-enabled devices in a wireless network, in which the plurality of DAS-enabled devices also communicate with each other by transferring data via an Access Point ("AP") device in the wireless network, the method comprising:

receiving a broadcast message wirelessly in a management action frame directly from a first DAS-enabled device of the plurality of DAS-enabled devices at a second DAS-enabled device of the plurality of DAS-enabled devices, wherein the first DAS-enabled device operates as a station when communicating with the AP device and as a subsidiary AP ("SAP") to the AP device when communicating directly with other DAS-enabled devices and wherein the broadcast message includes information indicating a basic transmission bit rate that is not supported by the wireless network for communicating via the AP device, in order to prevent non-DAS-enabled devices from directly connecting to the first DAS-enabled device when the first DAS-enabled device is operating as the SAP, and in which the management action frame is not a beacon frame that would cause the AP device to change to a different channel;

identifying in the second DAS-enabled device that the basic transmission bit rate that is not supported by the wireless network is an indication that the first DAS-enabled device is operating as the SAP to attempt to communicate directly with the second DAS-enabled device without accessing the AP device and in which the basic transmission bit rate that is not supported by the wireless network prevents non-DAS-enabled devices from accessing the wireless network by connecting to the first DAS-enabled device, when the first DAS-enabled device is operating as the SAP;

determining minimum requirements imposed by the first DAS-enabled device in the broadcast message;

determining in the second DAS-enabled device, if the second DAS-enabled device meets the minimum requirements imposed by the first DAS-enabled device to establish a direct communication path in the wireless network between the first DAS-enabled device and the second DAS-enabled device for direct data transfer without communicating via the AP device; and establishing the direct communication path between the first DAS-enabled device and the second DAS-enabled device for direct data transfer, without utilizing the AP device to establish the direct communication path, when the first DAS-enabled device is operating as the SAP and when the second DAS-enabled device meets the minimum requirements imposed by the first DAS-enabled device.

2. The method of claim 1 further including establishing a second direct communication path with at least a third DAS-enabled device of the plurality of DAS-enabled devices.

3. The method of claim 1, further including utilizing an Association Configuration Protocol ("ACP") to convey the minimum requirements in the broadcast message.

4. The method of claim 3, wherein an ACP type-length-value ("TLV") of the broadcast message is used to convey the minimum requirements.

5. The method of claim 4, further including entering into an ACP Active state in response to determining the minimum requirements of the first DAS-enabled device.

6. The method of claim 5, further including entering into an ACP Window state at the first DAS-enabled device after transmitting the broadcast message.

7. The method of claim 6, wherein entering into an ACP Window state is responsive to an external input.

8. The method of claim 1, wherein the direct data transfer is a quality of service (QOS) transfer.

9. A system for transmitting data directly between a plurality of Dual Access Point and Station ("DAS")-enabled devices in a wireless network, in which the plurality of DAS-enabled devices also communicate with each other by transferring data via an Access Point ("AP") device in the wireless network, the system comprising:

a first DAS-enabled device of the plurality of DAS-enabled devices, wherein the first DAS-enabled device operates as a station when communicating with the AP device and as a subsidiary AP ("SAP") to the AP device when communicating directly with other DAS-enabled devices and wherein the first DAS-enabled device wirelessly transmits a broadcast message in a management action frame directly to other DAS-enabled devices of the plurality of DAS-enabled devices, in which the broadcast message includes information indicating a basic transmission rate that is not supported by the wireless network for communicating via the AP device when the first DAS-enabled device is operating as the SAP, and in which the basic transmission bit rate that is not supported by the wireless network prevents non-DAS-enabled devices from accessing the wireless network by connecting to the first DAS-enabled device, when the first DAS-enabled device is operating as the SAP, and the broadcast message also includes minimum requirements imposed by the first DAS-enabled device to communicate directly with another DAS-enabled device without communicating via the AP device, and in which the management action frame is not a beacon frame that would cause the AP device to change to a different channel; and a second DAS-enabled device of the plurality of DAS-enabled devices to receive the management action frame, wherein the second DAS-enabled device includes a module to determine if the second DAS-enabled device meets the minimum requirements imposed by the first DAS-enabled device to establish a direct communication path between the first DAS-enabled device and the second DAS-enabled device for direct data transfer without communicating via the AP device, and to respond to the first DAS-enabled device to establish the direct communication path between the first DAS-enabled device and the second DAS-enabled device for the direct data transfer, without utilizing the AP device to establish the direct communication path in the wireless network, when the first DAS-enabled device is operating as the SAP and when the second DAS-enabled device meets the minimum requirements imposed by the first DAS-enabled device.

10. The system of claim 9, wherein the second DAS-enabled device utilizes an Association Configuration Protocol ("ACP") to convey the minimum requirements in the broadcast message.

11. The system of claim 10, wherein the first DAS-enabled device includes an ACP Configurator.

12. The system of claim 9, wherein the first DAS-enabled device is an IEEE 802.11 enabled device and the second DAS-enabled device is an IEEE 802.11 enabled device.

13. The system of claim 9, wherein the first DAS-enabled device is a device configured as a network master device and the second DAS-enabled device is a device configured as a network slave device.

14. The system of claim 9, wherein both the first DAS-enabled device and second DAS-enabled device are wireless devices.

15. The system of claim 9, wherein the direct data transfer is a quality of service (QOS) transfer.

16. A Dual Access Point and Station enabled device ("DAS-enabled device") on a wireless network for transmitting data directly between the DAS-enabled device and a second device, which is also DAS-enabled, on the network, in which the wireless network has an Access Point ("AP") device for transfer of data between the DAS-enabled device and the second device via the AP device, the DAS-enabled device comprising:

a station module to selectively communicate with the AP device when communicating on the wireless network via the AP device, in which the station module establishes an indirect communication path to the second device via the AP device; and a Subsidiary Access Point module ("SAP-module") to operate as a subsidiary access point ("SAP") for directly communicating with the second device without accessing the AP device when the DAS-enabled device is operating as the SAP, the SAP-module to wirelessly transmit a broadcast message in a management action frame directly to other DAS-enabled devices in the wireless network, in which the broadcast message includes information indicating a basic transmission rate that is not supported by the wireless network for communicating via the AP device when the DAS-enabled device is operating as the SAP and in which the basic transmission bit rate that is not supported by the wireless network prevents non-DAS-enabled devices from accessing the wireless network by connecting to the SAP-module when the DAS-enabled device is operating as the SAP, and the broadcast message also includes minimum requirements imposed by the DAS-enabled device to communicate directly with the second device without communicating via the AP device and when the second device identifies the basic transmission rate and responds to the broadcast message that the second device meets the minimum requirements for direct communication with the DAS-enabled device, the DAS-enabled device and the second device to establish a direct communication path in the wireless network between the DAS-enabled device and the second device, when the DAS-enabled device is operating as the SAP, for direct data transfer without utilizing the AP device, and in which the management action frame is not a beacon frame that would cause the AP device to change to a different channel.

17. The DAS-enabled device of claim 16, wherein the DAS-enabled device utilizes an Association Configuration Protocol ("ACP") to convey the minimum requirements in the broadcast message.

18. The DAS-enabled device of claim 17, wherein the SAP-module includes an ACP Configurator.

19. The DAS-enabled device of claim 16, wherein the DAS-enabled device is an IEEE 802.11 enabled device.

20. The DAS-enabled device of claim 16, wherein the direct data transfer is a quality of service (QOS) transfer.

* * * * *